US005819533A

United States Patent [19]

Moonen

[11] Patent Number: 5,819,533

[45] Date of Patent: Oct. 13, 1998

[54] HYDRAULIC-PNEUMATIC MOTOR

[76] Inventor: Raymond J. Moonen, 535 6th St., Apt. 112, Stearns, Minn. 56310

[21] Appl. No.: 769,873

[22] Filed: Dec. 19, 1996

[51] Int. Cl.[6] .................................................... F16D 31/02

[52] U.S. Cl. ............................... 60/413; 91/4 R; 91/166; 92/152

[58] Field of Search ............................. 91/4 R, 508, 165, 91/166; 92/151, 152; 417/375, 401; 60/325, 413

[56] References Cited

U.S. PATENT DOCUMENTS

| | | | |
|---|---|---|---|
| 1,027,957 | 5/1912 | Harris et al. . | |
| 3,086,470 | 4/1963 | Skipor et al. | 417/375 X |
| 3,485,141 | 12/1969 | Ott et al. | 92/151 X |
| 3,502,001 | 3/1970 | Moore | 92/152 X |
| 3,554,088 | 1/1971 | Bruyn | 92/151 X |
| 4,068,476 | 1/1978 | Kelsey | 60/325 X |
| 4,261,252 | 4/1981 | Senn | 92/151 X |

*Primary Examiner*—Hoang Nguyen
*Attorney, Agent, or Firm*—Albert W. Watkins

[57] ABSTRACT

A hydraulic motor has three interconnected power pistons. The pistons include passageways therebetween that allow a working fluid to be conserved upon reciprocating piston motion. Valves control the pressure state of working fluid within working chambers, which in turn will cause the three piston assembly to oscillate within the working chambers. The hydraulic motor is combined with a pressure source and an energy converter to form a hydraulic-pneumatic power plant. The energy converter converts pressurized working fluid from a single port into pressurized fluid passed through a first port and reduced pressure fluid passed through a second port. The pressure source is preferably pneumatic, which provides the necessary store of energy, or push, to initiate motion within the hydraulic motor.

11 Claims, 3 Drawing Sheets

HYDRAULIC-PNEUMATIC MOTOR

BACKGROUND OF THE INVENTION

1. Field of the Invention

The present invention pertains to fluid motors of the expansible chamber type and to power plants incorporating such motors. More particularly, the preferred embodiment of the present invention uses non-compressible hydraulic fluid as the working fluid, with compressed air as the pressure source.

2. Description of the Related Art

Fluid motors have ben in widespread use for many years. These motors generally use few moving parts, with the fluid in most instances acting as a lubricant to reduce wear of those moving parts during operation. Enormous forces may be transmitted by the fluid through long and winding passageways or conduits with little, if any, loss, using non-compressible fluids generally referred to as hydraulic fluids. These motors offer great advantage in applications requiring separation between pressure source and motor, as well as applications requiring large force to weight ratios.

In addition, fluid motors usually operate without the operator being exposed to hazards commonly associated with other types of motors. For example, gasoline and other similar internal combustion engines burn volatile, explosive fuels. In the process, the fuel must be introduced directly into a hot combustion chamber, and then toxic combustion by-products must be removed. Leaks in the fuel supply have caused countless fires, while inadequate ventilation has led to many deaths due to asphyxiation.

Electric motors are often used in areas without ventilation or where the presence of a volatile fuel is unacceptable. Once again, delivery of energy to the motor proves to be problematic. Electric motors require wiring and high voltages. While wiring may be designed to be well-protected, countless people have been electrocuted, and many more severely shocked. Moreover, large forces are difficult to obtain with electric motors, and large gear boxes are required to increase the force delivered. Such gearboxes add weight and often are more expensive than the motor.

Hydraulic motors, on the other hand, alleviate these problems. In the event of a leak, hydraulic fluid is dripped or gently sprayed into the surroundings. The wear parts are most commonly the seals, which are readily replaced. Hydraulic motors are also noted for reliability in extreme conditions, and so are found in highly demanding environments such as in vehicular braking systems.

One early disclosure of hydraulic motors is in U.S. Pat. No. 1,027,957 to Withers and Harris. Therein, a hydraulic piston 13 is moved to and fro within a cylinder 12. Direction of movement of piston 13 is controlled through valve 29, which merely reverses the side of piston 13 to which a pressurized fluid is applied. Many other hydraulic systems have been used in the prior art where the hydraulic fluid is merely passed from the pressurized side of the piston back into an ambient, where the fluid will once again be collected and pressurized by the hydraulic pump.

These hydraulic motors of the prior art, due to their design, failed to fully utilize the energy available from the hydraulic fluid. The release of hydraulic fluid results in an undesirable loss of efficiency. Furthermore, the hydraulic pump of the prior art may incorporate many of the undesirable features of the alternative prior art motors, such as requiring electricity or chemical fuel sources.

SUMMARY OF THE INVENTION

A hydraulic motor having a first piston of a first diameter is rigidly connected from a first working surface to a second piston of a second diameter and from a second working surface to a third piston of a third diameter, said second and third pistons having a combined working surface area similar to the working surface area of said first piston. Fluid passageways are provided which allow hydraulic fluid to pass freely in either direction between the first working surface of the first piston, through said first piston, and through said third piston. Similar fluid passageways are provided which allow hydraulic fluid to pass freely in either direction between the second working surface of the first piston, through said first piston, and through said second piston. Valves control the pressure state of working fluid within working chambers, which in turn will cause the three piston assembly to oscillate within the working chambers.

In a second aspect of the invention, the hydraulic motor is combined with pressure source and an energy converter. The energy converter converts pressurized working fluid from a single port into pressurized fluid passed through a first port and reduced pressure fluid passed through a second port. The pressure source is preferably pneumatic, which provides the necessary store of energy, or push, to initiate motion within the hydraulic motor.

OBJECTS OF THE INVENTION

A first object of the invention is to provide a very high efficiency motor capable of extended operation. A further object of the invention is to provide a relatively safe and environmentally friendly power plant which is both durable and economical. An additional object of the invention is to provide a power plant of design relatively independent of size and scaling, to allow scaling to meet particular application requirements. These and other objects are achieved in the present invention, a better understanding of which may be obtained through the following description and drawings of the preferred embodiment.

DESCRIPTION OF THE PREFERRED EMBODIMENT

Figure 1:
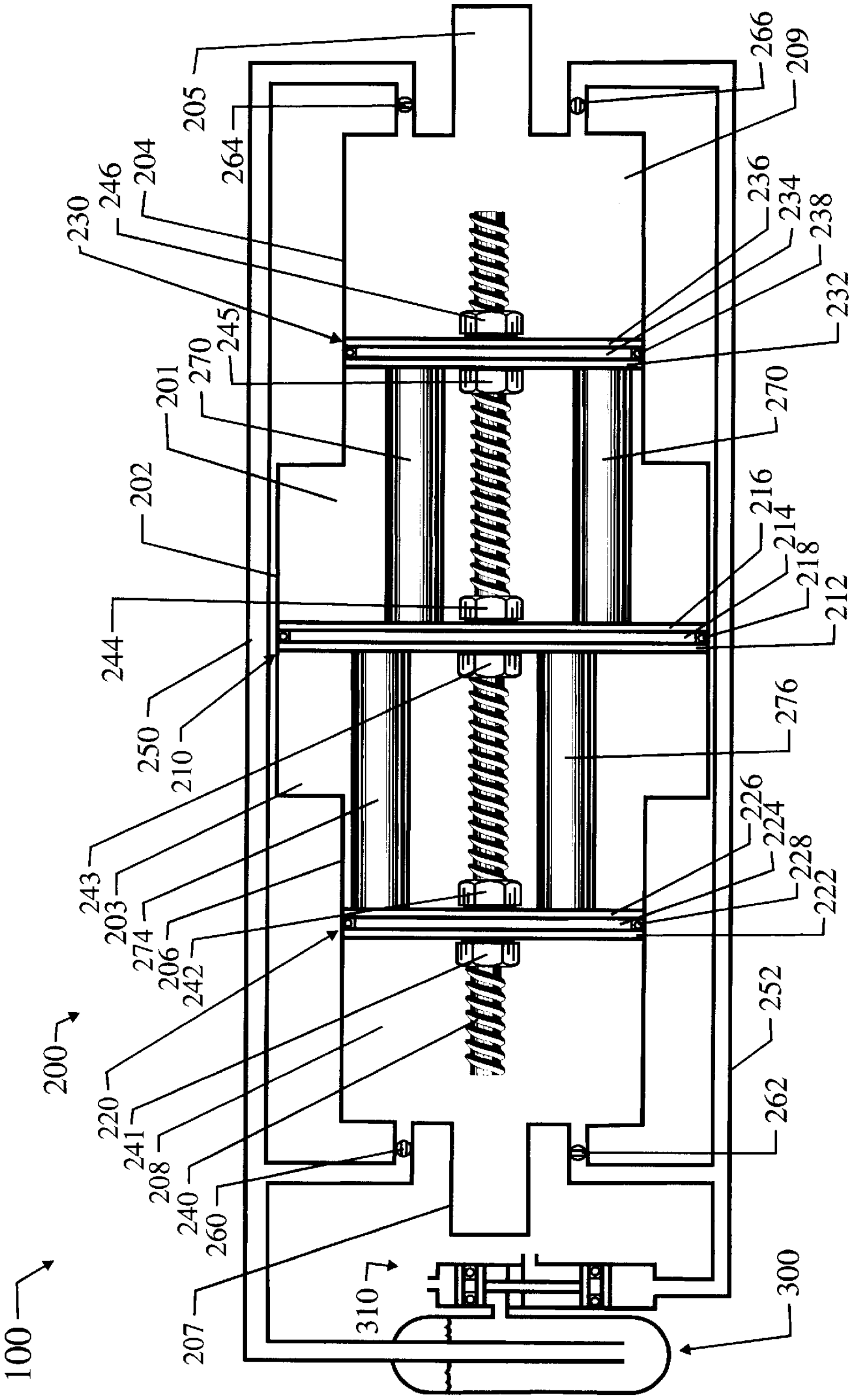
FIG. 1 illustrates a preferred embodiment of the hydraulic-pneumatic power plant through a combined side/schematic view.

Hydraulic-pneumatic power plant 100 includes hydraulic-pneumatic motor 200, pressure reservoir 300 and energy converter 310. Pressure reservoir 300 acts as an accumulator, or large storage tank of pressurized working fluid 301. For the purposes of the present invention, working fluid 301 will be understood to be a relatively non-compressible liquid as known in the art, such as hydraulic liquid. Pressurized working fluid 301 is transmitted to energy converter 310 for conversion from a source for pressurized fluid into a suction source, hereinafter referred to as a suction source, vacuum source, vacuum fluid or vacuum line. Pressurized and vacuum fluids are separately transmitted, as will be described in more detail hereinbelow, to the hydraulic-pneumatic motor 200, where motion is generated.

Hydraulic-pneumatic motor 200 has a center piston 210, right piston 230 and left piston 220. The pistons 210, 220 and 230 are rigidly interconnected by threaded connecting rod 240. Connecting rod 240 extends entirely through pistons 210, 220 and 230, and retains each in predetermined location through nuts 241, 242, 243, 244, 245 and 246. Compression between nuts 241 and 242 serves to force left retaining lip 222 towards right retaining lip 226, thereby compressing O-ring seal 228. The compressive force, which also diminishes seal gap 224, causes O-ring seal 228 to be forced outward into sealing engagement with chamber wall 206. Similarly, compression between nuts 243 and 244 serves to force left retaining lip 212 towards right retaining lip 216, thereby compressing O-ring seal 218. Compression between nuts 245 and 246 serves to force left retaining lip 232 towards right retaining lip 236, thereby compressing O-ring seal 238.

While the preferred embodiment incorporates multiple section pistons compressed by nuts, one skilled in the art will recognize the many variations are known which may be adapted to the present motor 200. For example, connecting rod 240 may be divided into two sections, with a first section threaded into nut 242 and nut 243, with a second section threaded into nuts 244 and 245. Pistons 210, 220 and 230 must then be formed as integral components shaped like a thread or wire spool with a groove, as opposed to gaps 214, 224 and 234, into which O-ring seals may be seated. In yet a further alternative, nuts 241–246 may be eliminated altogether and replaced by welds or other methods of attachment. The particular details of each piston and seal are not considered consequential to the invention, other than for considerations notorious in the art. However, due to ease of installation and maintenance of seals 218, 228 and 238, the present arrangement of connecting rod 240 and nuts 241–246 is preferred.

Each of the three pistons 200, 210 and 220 oscillate within a matched diameter power chamber delineated by a power chamber wall. Center power chamber wall 202 forms a cylindrical chamber around center piston 210, right power chamber wall 204 forms a cylindrical chamber around right piston 230 and left power chamber wall 206 forms a cylindrical chamber around piston 220. Two additional power chamber walls 205 and 207 are provided at the right and left ends of motor 200, respectively. Chamber walls 205 and 207 form end enclosures for motor 200, within which threaded connecting rod 240 may extend during oscillation of pistons 210, 220 and 230.

Between left piston 220 and center piston 210 is fluid chamber 203, and between right piston 230 and center piston 210 is fluid chamber 201. Two additional fluid chambers are provided, chamber 208 left of left piston 220 and chamber 209 right of right piston 230.

Pressure is provided to motor 200 through pressurized hydraulic line 250, and vacuum or suction force is provided through vacuum hydraulic line 252. Four valves control the transmission of pressure and suction through working fluid 301. On the left side within chamber 208, pressure is admitted from line 250 through valve 260, while vacuum is admitted from line 252 through valve 262. The valves are controlled by a common actuator so that when valve 260 is open, valve 262 is closed, and when valve 262 is open, valve 260 will be closed. On the right side within chamber 209, pressure is admitted through valve 264, while vacuum is admitted through valve 266. These valves are also controlled by a common actuator so that when valve 264 is open, valve 266 is closed, and when valve 266 is open, valve 264 will be closed.

The actuator, which is not illustrated, may either be electrically controlled or mechanically controlled. Devices of this nature, which activate one valve while simultaneously de-activating another valve, are known in the hydraulics art and come in mechanical or electrical form. In one embodiment of the invention, which is described solely for a complete understanding, sprockets for each valve are coupled by a chain. A rotary source, which might be a handle or a motorized drive sprocket, engages with the sprockets and chain. Pressure valves 260 and 266 are oriented 90 degrees from the orientation of vacuum valves 262 and 264, such that during each 90 degree rotation pressure is applied in one of chambers 208 and 209, while vacuum is applied in the other, with pressure and vacuum alternating within a single chamber as the valves are rotated by the chain and sprockets.

Referring to FIG. 1, valve 260 is shown as being open, while valve 262 is closed. Chamber 208 is, therefore, pressurized to the pressure of working fluid 301 in line 250. Valve 264 is closed, while valve 266 is open. Therefore, chamber 209 is drawing a suction force equal to the suction force within line 252.

Since working fluid 301 is non-compressible, there will be no substantive movement of working fluid when valves 260–266 are rotated. However, the pressure and suction forces will be communicated through the fluid. In the preferred embodiment, pressure line 250 carries a force of 100 pounds per square inch, while vacuum line 252 will be drawing a vacuum force of 100 pounds per square inch. These forces are, of course, a function of the designer's intended objectives and the strength and materials selected for chamber walls, pistons, etc.

Once a suction force is applied to chamber 209, the suction force will be communicated to chamber 203 through passageways 270 and 272, which are cylindrical pipes interconnecting but passing entirely through pistons 210 and 230. Similarly, the pressure force will be communicated through passageways 274 and 276 from chamber 208 into chamber 201. In the embodiment having 100 psi of pressure and vacuum, piston 210 will, on right retaining lip 216 have a pressure force of 100 psi. applied thereto. On left retaining lip 212 a suction force of 100 psi. is applied. In that embodiment of the invention, piston 210 has a diameter of 12 inches. Both the suction force on lip 212 and the pressure force on lip 216 are acting in the same direction, forcing piston 210 to the left.

Left piston 220 has a pressure force in chamber 208 applied to left retaining lip 222, and a suction force in chamber 203 applied to right retaining lip 226. These forces are acting in the same direction, tending to force piston 220 to the right, opposite of the forces on piston 210. Right piston 230 has a suction force in chamber 209 applied to right retaining lip 236 and a pressure force in chamber 201 applied to left retaining lip 232. These forces are acting in the same direction on piston 230, also tending to force piston 230 to the right, as with piston 210. In the embodiment using 100 psi pressure and suction and a twelve inch diameter piston 210, pistons 220 and 230 each have diameters of eight inches. Thousands of pounds of force are generated by that embodiment. Other embodiments are conceived of having different ratios of sizes between piston 210 and pistons 220 and 230, one being that of the surface areas of piston 210 much more nearly equalling the surface area of pistons 220 and 230. In the preferred embodiment, pistons 210, 220 and 230 are illustrated as having relatively flat surfaces extending perpendicular to the axis of motion. However, there is no requirement that this be so. The important factor is the effective surface area which is parallel to the axis of motion, which, for the purposes of this disclosure, shall be referred to herein as the working surface area. Against this working surface area working fluid 301 is applied at a pressure or vacuum force, thereby generating a force tending to move the working surface.

Figure 2:
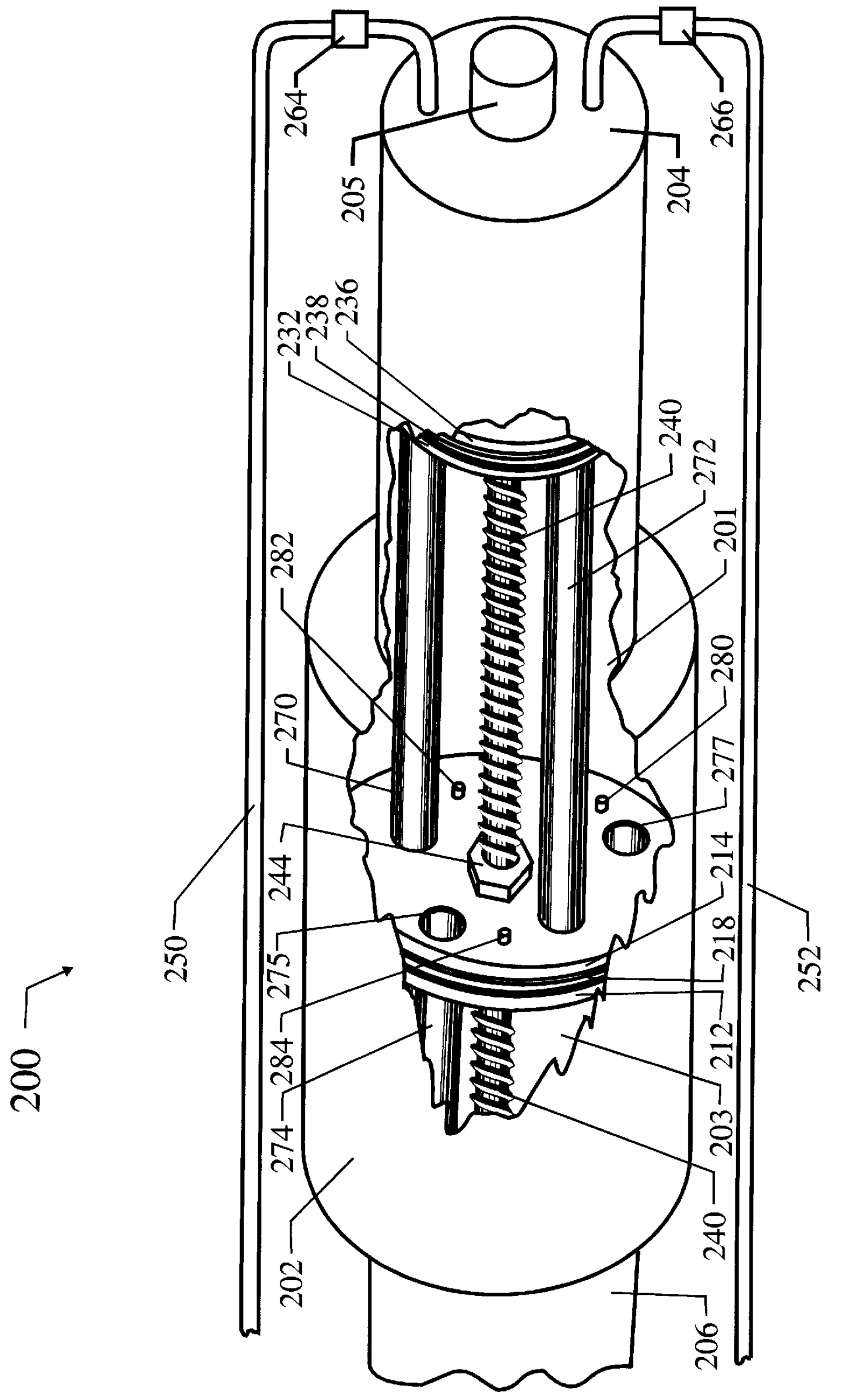
FIG. 2 illustrates the hydraulic-pneumatic motor of the preferred embodiment shown in FIG. 1 from a side cut-away view.

Once piston 210 has completed travel to the left, valves 260–266 may be rotated ninety degrees, thereby reversing pressures and suction, and drawing piston 210 to the right, once again with thousands of pounds of force. In one embodiment shown in FIG. 2, piston 210 may be provided with small piston travel stops 280, 282 and 284 which act as cushions to prevent damaging impacts from occurring between piston 210 and the ends of chamber wall 202. Stops 280–284 also serve to ensure the passage of hydraulic fluid into the working surface, thereby preserving full force generated from the working surface area.

Sensors may be used to detect the position of pistons 210, 220 and 230, or to sense the vibrations induced by stops 280–284. The sensors may then be used in known way to rotate valves 260–266 and reverse motion in motor 200. Motor 200 may be provided with a shaft extending parallel to connecting rod 240, or even extending directly therefrom. Such a shaft would extend through a chamber wall, such as right connecting rod chamber wall 205, and wall 205 would then include a hydraulic seal therein. The reciprocating shaft then acts as a source of motive power for other applications, including but not limited to electrical generation and direct motive power.

The forces applied to pistons 220 and 230 are opposing the forces applied to piston 210. At first blush, these opposing forces would appear to be a disadvantage to the motor, requiring extra structure to obtain diminished forces. However, by so designing the system, hydraulic fluid is transferred internally within motor 200 during movement of pistons 210, 220 and 230 and is therefore conserved. For example, given the valving arrangement shown in FIG. 1, piston 210 will be moved to the left. As this movement takes place, working fluid 301 is displaced from chamber 203. But, since chamber 203 is in communication with chamber 209, fluid 301 from chamber 203 is transferred to chamber 209. A similar transfer of fluid 301 occurs between chambers 201 and 208.

The transfer of fluid through passageways 270–276 is critical. However, various numbers of passageways, having various different dimensions have been conceived of. In the preferred embodiment, there are a total of six passageways, spaced at sixty degree intervals around connecting rod 240 on piston 210. Each of these passageways are two inches in diameter. Around pistons 220 and 230 then, passageways are spaced at one hundred and twenty degree intervals. The staggered nature of the passageways is more clearly illustrated in FIG. 2. Holes 275 and 277 are visible therein which pass through center piston 210 to passageways 274 and 276, respectively.

The rate at which the pistons 210, 220 and 230 travel from one side to the other is limited, in cases of no external load, by the speed at which the hydraulic fluid may be moved through the passageways. The speed of transfer is a function of the forces generated by pistons 210, 220 and 230, and the viscosity and rheology of working fluid 301.

Figure 3:
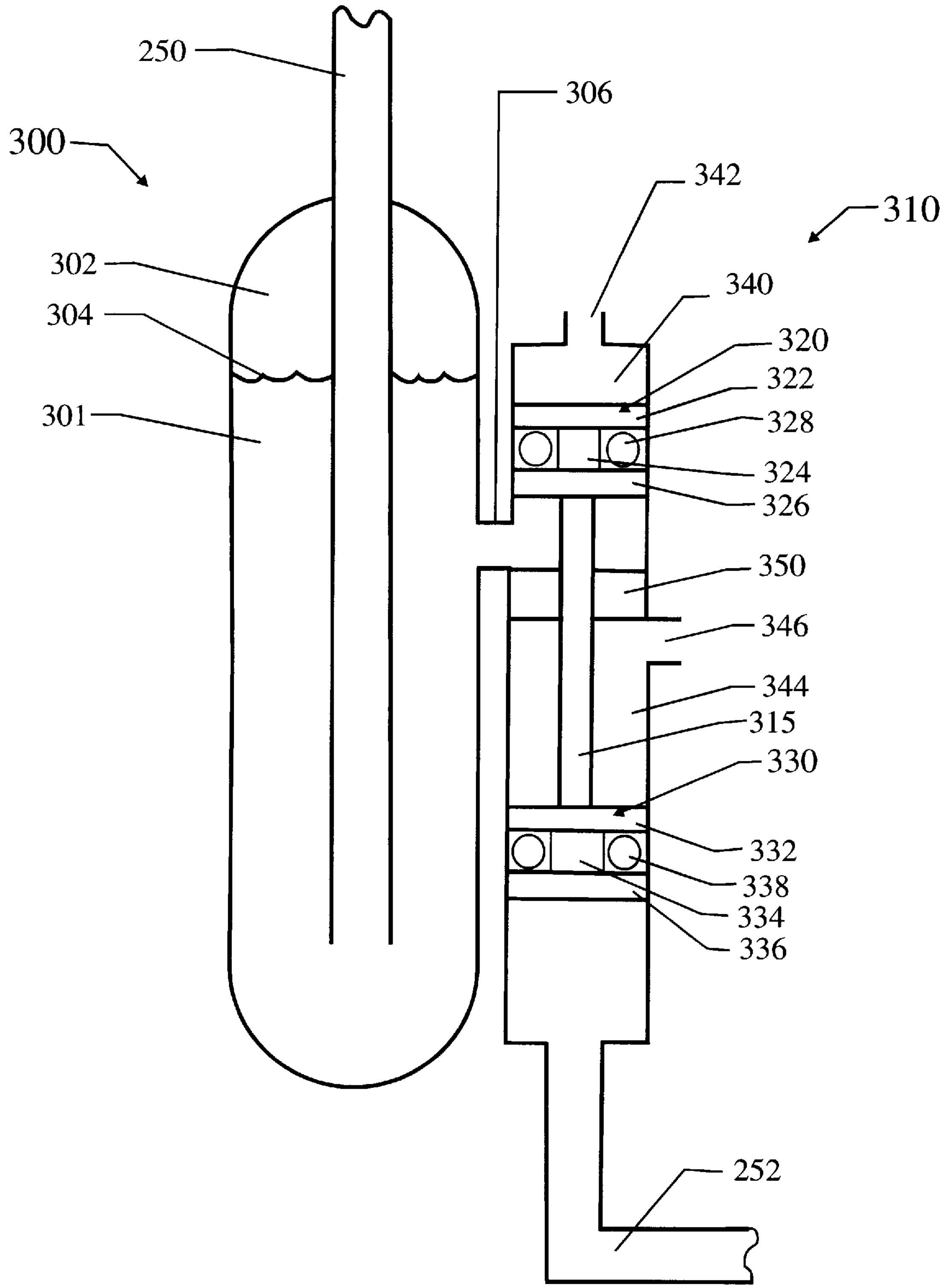
FIG. 3 illustrates the pressure reservoir and energy converter of FIG. 1 schematically, in more detail than shown in FIG. 1.

Motor 200 requires a source of pressure, which is derived from pressure reservoir 300, illustrated schematically in more detail in FIG. 3. Reservoir 300 contains in a majority thereof working fluid 301. However, a smaller chamber 302 of compressed air acts as a pressure source. A small filling valve, not shown, would typically be provided for the introduction of compressed air 302. Compressed air 302 may be separated form the working fluid at interface 304 by some type of a bladder, or may be in direct contact therewith, depending upon the type of working fluid 301 used and the exact composition of the compressed gas used. Note that although air is preferred, air is not the only gas which is suitable. In addition, there are other techniques known in the prior art for separating air 302 from working fluid 301, include the provision of pistons that separate compressed air 302 from working fluid 301.

Reservoir 300 includes a pressure connection 306 which interfaces pressure reservoir 300 to energy converter 310. Converter 310 is primarily divided into two working sections by pressure/vacuum chamber divider 350. The top section includes a pressure piston 320 which has an air side retaining lip 322, a fluid side retaining lip 326, a seal gap 324 and a seal ring 328. This piston 320 construction is very similar to pistons 210, 220 and 230. Air side retaining lip 322 is exposed to ambient (atmospheric) air pressure through air chamber 340 and ambient vent 342. Fluid side retaining lip 326 is exposed to working fluid 301 ported through pressure connection 306.

Pressure piston 320 is connected through connecting rod 315 to vacuum piston 330. Connecting rod 315 passes through chamber divider 350, and divider 350 will normally include a hydraulic seal therein. Vacuum piston 330 has an air side retaining lip 332, a seal gap 334, a fluid side retaining lip 336 and a seal ring 338, once again very similar in construction to piston 210. Air side retaining lip 332 is in communication with ambient (atmospheric) pressure through air chamber 344 and ambient vent 346.

When a pressure is first applied to working fluid 301 within reservoir 300, the pressure is applied to fluid side retaining lip 326. This force against pressure piston 320 is not offset on air side retaining lip 332, so pressure piston 320 is forced towards ambient vent 342. However, connecting rod 315 interconnects pressure piston 320 to vacuum piston 330, and thereby an upward force is also applied to vacuum piston 330. The upward force on vacuum piston 330 is counteracted only by transmission of a suction force into vacuum hydraulic line 252. By pressurizing working fluid 301 in reservoir 300, a vacuum force is created in line 252 by energy converter 310.

While the foregoing details what is felt to be the preferred embodiment of the invention and a number of specific alternatives, no material limitations to the scope of the claimed invention are intended. Further, features, materials and design alternatives that would be obvious to one of ordinary skill in the art are considered to be incorporated herein. The scope of the invention is set forth and particularly described in the claims hereinbelow.

I claim:

1. A hydraulic motor comprising:

a first reciprocating piston within a first chamber having a first working surface adjacent a first working fluid and a second working surface opposed to said first working surface and adjacent a second working fluid;

a second piston within a second chamber having a third working surface adjacent a third working fluid and a fourth working surface opposed to said third working surface and adjacent said first working fluid;

a third piston within a third chamber having a fifth working surface adjacent said second working fluid and a sixth working surface opposed to said fifth working surface and adjacent a fourth working fluid;

a rigid mechanical connection between said first piston, said second piston and said third piston which maintains said first, second and third pistons in fixed spatial relation with each other;

a first fluid passageway which interconnects said working fluid from said first working surface to said third working surface;

a second fluid passageway which interconnects said working fluid from said second working surface to said third working surface; and a source of pressure in a first state applied to said second chamber and disconnected from said third chamber, and in a second state applied to said third chamber and disconnected from said second chamber, said source of pressure switched between said first and second states to thereby apply reciprocating force to said first, second and third pistons;

whereby, when said first, second and third pistons are allowed to reciprocate, working fluid is primarily transferred between said second chamber and said first chamber through said second fluid passageway and between said third chamber and said first chamber through said first fluid passageway, with minimal transfer from said source of pressure to said chambers, thereby conserving and internally recirculating said working fluid within said hydraulic motor during said reciprocation.

2. The hydraulic motor of claim 1 further comprising a source of vacuum in said first state applied to said third chamber and disconnected from said second chamber, and in said second state applied to said second chamber and disconnected from said third chamber.

3. The hydraulic motor of claim 1 wherein said first working surface has a working surface area which is similar to a combined working surface area of said third working surface and said sixth working surface.

4. The hydraulic motor of claim 3 wherein said first working surface area is slightly larger than said combined working surface area.

5. The hydraulic motor of claim 1 wherein said first, second and third pistons are arranged to reciprocate axially along an axis of reciprocation.

6. The hydraulic motor of claim 5 further comprising valves for controlling said application of pressure to said second and third chambers, which, when said valves are in a first state causes said first, second and third pistons to move in a first direction along said axis of reciprocation, and when said valves are in a second state causes said first, second and third pistons to move in a second direction opposite to said first direction along said axis of reciprocation.

7. The hydraulic motor of claim 1 wherein said first fluid passageway restricts the rate of transfer of said working fluid between said first working surface and said third working surface.

8. A hydraulic-pneumatic power plant comprising:

a hydraulic motor having a first reciprocating piston of a first diameter for reciprocating along an axis within a first cylinder and forming a seal therewith, thereby dividing said first cylinder into a first working fluid chamber containing working fluid therein and a second working fluid chamber containing working fluid therein, said first piston having a first working surface adjacent said first working fluid chamber and a second working surface adjacent said second working fluid chamber, said first cylinder having first and second openings at opposite axial ends;

a second piston having a second diameter and reciprocating along said axis within a second cylinder and forming a seal therewith, said second cylinder open to said first working fluid chamber at one end, said second piston thereby dividing said second cylinder into said first working fluid chamber and a third working fluid chamber having working fluid therein;

a third piston having a third diameter and reciprocating along said axis within a third cylinder and forming a seal therewith, said third cylinder open to said second working fluid chamber at one end, said third piston thereby dividing said third cylinder into said second working fluid chamber and a fourth working fluid chamber having working fluid therein;

a connecting rod rigidly connected from said first working surface to said second piston and from said second working surface to said third piston;

a first sealed fluid passageway extending from said first working surface through said first piston and through said third piston into said fourth working fluid chamber;

a second sealed fluid passageway extending from said second working surface through said first piston and through said second piston into said third working fluid chamber;

a source of vacuum and a source of pressure which are operatively applied to said third and fourth working fluid chambers; and valves for controlling the pressure state of working fluid within said third and fourth working fluid chambers, which, when said valves are in a first state applies pressure to said third chamber and vacuum to said fourth chamber, thereby causing said first, second and third pistons to move in a first direction along said axis, and when said valves are in a second state applies pressure to said fourth chamber and vacuum to said third chamber, thereby causing said first, second and third pistons to move in a second direction opposite to said first direction along said axis said working fluid primarily internally recirculated within said hydraulic motor during said movement.

9. The hydraulic-pneumatic power plant of claim 8 wherein said source of pressure further comprises a pneumatic chamber.

10. The hydraulic-pneumatic power plant of claim 8 wherein said source of vacuum is generated by an energy converter driven by said source of pressure.

11. The hydraulic-pneumatic power plant of claim 10 wherein said source of vacuum comprises a first and a second piston operatively interconnected, said first piston exposed to ambient on a first surface and to said source of pressure on a second surface, said second piston exposed to ambient on a first surface and to a working fluid on a second surface.

* * * * *